US012123561B2

(12) United States Patent
Darlage et al.

(10) Patent No.: US 12,123,561 B2
(45) Date of Patent: Oct. 22, 2024

(54) MULTI-COLOR ILLUMINATED COMPONENT WITH A SINGLE-COLOR LIGHT SOURCE

(71) Applicant: Valeo North America, Inc., Troy, MI (US)

(72) Inventors: Colby Darlage, Troy, MI (US); Robert Fraizer, Auburn Hills, MI (US); Jean Sebastien Delfosse, Auburn Hills, MI (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 18/064,397

(22) Filed: Dec. 12, 2022

(65) Prior Publication Data

US 2024/0191852 A1 Jun. 13, 2024

(51) Int. Cl.
*F21S 41/125* (2018.01)
*F21S 41/24* (2018.01)
*F21S 43/235* (2018.01)
*F21S 43/50* (2018.01)
*B60Q 1/26* (2006.01)
*B60Q 1/28* (2006.01)

(52) U.S. Cl.
CPC ............ *F21S 41/125* (2018.01); *F21S 41/24* (2018.01); *F21S 43/235* (2018.01); *F21S 43/50* (2018.01); *B60Q 1/2669* (2013.01); *B60Q 1/28* (2013.01)

(58) Field of Classification Search
CPC .. F21S 41/125; F21V 3/12; F21V 5/10; F21V 9/32; F21K 9/64; G02B 6/0003; G02B 6/0043; G09F 13/18; G09F 2013/1868; G09F 13/20
See application file for complete search history.

(56) References Cited

U.S. PATENT DOCUMENTS

| 5,546,687 | A | * | 8/1996 | Iorfida | .................. G01D 11/28 362/128 |
| 5,764,403 | A | * | 6/1998 | Downing | ................ G11C 13/04 348/E13.055 |
| 6,986,581 | B2 | * | 1/2006 | Sun | ........................ G03B 21/60 359/452 |
| 7,246,930 | B2 | | 7/2007 | Yatsuda et al. | |

(Continued)

FOREIGN PATENT DOCUMENTS

DE 102012212244 A1 1/2014
DE 102014203245 A1 8/2015
(Continued)

*Primary Examiner* — Ismael Negron
(74) *Attorney, Agent, or Firm* — Young Basile Hanlon & MacFarlane, P.C.

(57) ABSTRACT

An illuminated vehicle component including a substrate; a first coating on the substrate; a second coating on the substrate; and light sources of a first color arranged to project light into the substrate. At least one of the first coating, or the second coating form one or more patterns. Light from the light source is received by the first coating to produce light with a second color that is different from the first color, and received by the second coating to provide light with a third color that is different from the first color and the second color. The pattern formed by the first coating and the second coating is visible when the one or more light sources are illuminated.

20 Claims, 5 Drawing Sheets

(56) References Cited

U.S. PATENT DOCUMENTS

| | | | |
|---|---|---|---|
| 7,441,928 B2 | 10/2008 | Futami | |
| 7,575,349 B2 * | 8/2009 | Bucher | B60Q 1/503 |
| | | | 40/543 |
| 7,834,752 B2 * | 11/2010 | Kuvantrarai | B60Q 1/503 |
| | | | 362/504 |
| 7,976,169 B2 * | 7/2011 | Liu | G09G 3/003 |
| | | | 359/452 |
| 8,465,171 B2 | 6/2013 | Kishimoto et al. | |
| 8,690,406 B2 | 4/2014 | Drenten et al. | |
| 8,702,286 B2 | 4/2014 | Nakazato et al. | |
| 8,956,025 B2 | 2/2015 | Kushimoto | |
| 9,103,517 B2 | 8/2015 | Nakazato et al. | |
| 9,256,021 B2 * | 2/2016 | Hikmet | G02B 6/0041 |
| 9,452,708 B2 * | 9/2016 | Salter | G09F 21/04 |
| 9,539,939 B2 * | 1/2017 | Salter | B60Q 3/68 |
| 9,548,009 B2 * | 1/2017 | Pickett | G09F 13/18 |
| 9,766,454 B2 | 9/2017 | Chau et al. | |
| 9,937,855 B2 * | 4/2018 | Dellock | E06B 7/00 |
| 10,064,259 B2 * | 8/2018 | Buttolo | H05B 47/16 |
| 10,081,295 B2 * | 9/2018 | Dellock | F21V 23/003 |
| 10,118,568 B2 * | 11/2018 | Salter | F21K 9/64 |
| 10,288,260 B2 | 5/2019 | Tsukatani et al. | |
| 10,400,970 B2 | 9/2019 | Koiwa et al. | |
| 2010/0202255 A1 * | 8/2010 | Klopfenstein | G04B 19/32 |
| | | | 368/226 |
| 2012/0200219 A1 * | 8/2012 | Song | B82Y 20/00 |
| | | | 445/24 |
| 2014/0097356 A1 * | 4/2014 | Park | G02B 6/0035 |
| | | | 250/458.1 |

FOREIGN PATENT DOCUMENTS

| | | |
|---|---|---|
| EP | 2772682 B1 | 9/2020 |
| EP | 3018004 B1 | 2/2021 |
| JP | 4884354 B2 | 2/2012 |

* cited by examiner

MULTI-COLOR ILLUMINATED COMPONENT WITH A SINGLE-COLOR LIGHT SOURCE

FIELD

The present teachings relate to an illuminated component that can generate more than one color with a single-color light source.

BACKGROUND

Vehicles include many different types of lights. Some types of lights included on a vehicle are low beam headlights, high beam headlights, taillights, turn signal lights, fog lights, running lights, or a combination thereof. Each of these lights extend out of an outer surface of a vehicle so that they provide light for the driver or provide notice to surrounding drivers. These light systems generally direct light outward from the vehicle. Some lights have been provided on vehicles to provide decoration or decorative features around a vehicle.

Examples of light systems may be disclosed in U.S. Pat. Nos. 7,575,349; 8,702,286; 9,766,454; and 10,400,970 all of which are expressly incorporated herein by reference for all purposes. Thus, there is a need for an illuminated component that can provide multiple colors with one light source or light sources with a single color. There is a need for a component and method of producing the illuminated component such that the component when unlit appears as a single color and then when lit provides multiple colors. There is a need for a system and method where the illuminated component illuminates in a first pattern and color and then again in a second pattern and second color. It would be desirable to have an illuminated component that includes multiple patterns that are not visible to the naked eye when the illuminated component is unlit and then each light pattern is visible when the illuminated component is lit.

SUMMARY

The present teachings provide: an illuminated component comprising: a substrate; a first coating covering all or a portion of the substrate; a second coating covering all or a portion of the substrate, the first coating, or both; and one or more light sources aligned with the substrate, wherein the one or more light sources provide light of a first color; wherein a portion of the first coating, the second coating, or both is absent forming one or more patterns within the first coating and the second coating; wherein the light having the first color exits the substrate to: provide light with a second color that is different from the light with the first color by the first coating changing a color of the first light and provide light with a third color that is different from the first color and the second color by the second coating changing a color of the first light; and wherein the illuminated component is part of a vehicle and the pattern is visible with the second color and the third color when the one or more light sources are illuminated.

The present teachings provide: an illuminated component comprising: a substrate comprising: two or more coatings, wherein the two or more coatings comprise: a first coating covering all or a portion of the substrate; a second coating covering all or a portion of the substrate, the first coating, or both, wherein the first coating and the second coating form a pattern, shape, image, decoration, or a combination thereof therebetween; and one or more light sources aligned with the substrate to provide light with a single color into the substrate; wherein the light with the single color changes to a second color when the light contacts the first coating and the light with the single color changes to a third color when the light contacts the second coating so that the pattern, shape, image, decoration, or a combination thereof is visible in two colors from an exterior of a vehicle comprising the illuminated component.

The present teachings provide: a process comprising: applying a first coating to a substrate; removing a portion of the first coating to form a pattern, shape, image, decoration, or a combination thereof; applying a second coating to the substrate; and directing light with a single color into the substrate so that the first coating provides a first secondary color and the second coating provides a second secondary color and the pattern, shape, image, decoration, or a combination thereof is visible in two or more colors.

The present teachings provide an illuminated component that can provide multiple colors with one light source or light sources with a single color. The present teachings provide an illuminated component and method of producing the illuminated component such that the component when unlit appears as a single color and then when lit provides multiple colors. The present teachings provide a system and method where the illuminated component illuminates in a first pattern and color and then again in a second pattern and second color. The present teachings provide an illuminated component that includes multiple patterns that are not visible to the naked eye when the illuminated component is unlit and then each light pattern is visible when the illuminated component is lit.

DETAILED DESCRIPTION

Figure 1A:
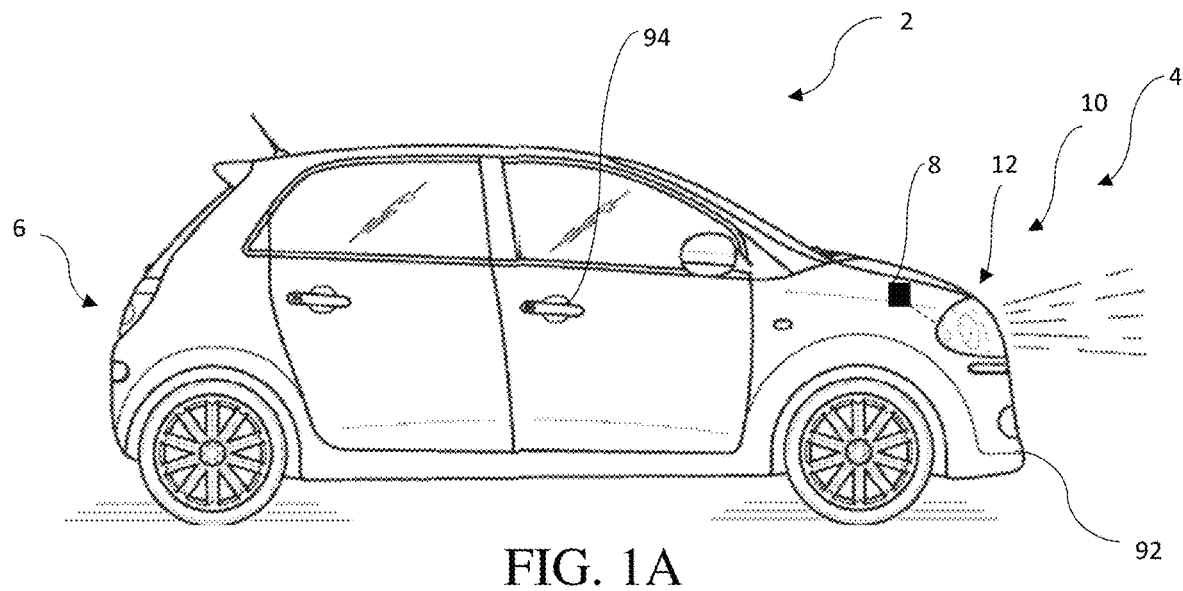
FIG. 1A is a side view of a vehicle including a light system.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a light system. The light system is located within a vehicle. Preferably, the light system is part of a vehicle such as a car, motorcycle, bus, truck, semi-truck, SUV, XUV, four-wheeler, dirt bike, tractor, combine, heavy equipment, farm equipment, industrial equipment, commercial equipment, or a combination thereof. The light system may project light in a forward direction, rear direction, side direction, vertical direction (e.g., z-axis), from a fore to an aft, an aft to a fore, or a combination thereof. Preferably, the light system projects a light from an external surface of the vehicle to a location in front of the vehicle or at an angle relative to the front or rear of a vehicle.

The light system may direct some light at the ground. The light system may direct some light above the ground. The light system may be integrated into a front end, a rear end, or both of a car. The light system may be an assembly. The light system may be a sealed light system that is integrated into a vehicle. The light system may be a sub-assembly that is included in a larger light system. The light system may be integrated into another light system and may function to be part of the light system. The light system may project light out of the vehicle. The light system may include multiple different lights or light sub-systems that each provide a different function. The light systems may be multiple light systems or light sources stacked one above the other, side by side, within different planes, within a same plane and projecting in different direction, integrated into a single light system, or a combination thereof. The light system may have multiple smaller light systems or light sources. The light systems may be covered by one or more outer lenses or may be free of an outer lens.

The outer lens may form an outer most surface of the light system. The outer lens may function to protect all or a portion of the light system. The outer lens may be free of covering an illuminated component. The outer lens may cover the headlights and may be free of covering the illuminated components (e.g., a grille, handle, bumper).

The plurality of light systems or lights may be located in one light system or one component. The plurality of light systems may operate independently of one another such that one light system may not affect another light system or portion of the light system. The light system may provide light with two or more colors, three or more colors, four or more colors, or a combination thereof. The light system may provide signals, symbols, words, images, patterns, ornamentation, decoration, or a combination thereof. The light system may provide an illuminated component.

The illuminated component taught herein may be any component of a vehicle that provides light, decoration, notice, conveys a message, or a combination thereof. The light may be provided to illuminate a region around a vehicle, to convey a message, to provide effects around a vehicle, to provide ornamentation, provide decoration, or a combination thereof. The illuminated component may provide two or more, three or more, four or more, or five or more lights or colors of lights (e.g., wavelengths of light). The illuminated components may be any color on the visible light spectrum. The illuminated components may be red, orange, yellow, blue, green, purple, a shade of those colors, or a combination thereof. The illuminated components may project light outward in a pre-determined pattern or shape of any desire. The illuminated components may be a grille, a door handle, a bumper, a fender, a quarter panel, facia, a component made of plastic, or a combination thereof. The illuminated components may be a movable component, a static component, or both. The illuminated component may be on a front, side, rear, or a combination thereof of a vehicle. The illuminated component may be a non-structural component. The illuminated components may be part of a light system. The illuminated components may provide light that does not provide a lighting function during movement. For example, the light provided by the illuminated component may be entirely decorative. For example, the illuminated component may operate when the doors are locked, the doors are unlocked, the car is in park, the car not moving, or a combination thereof. The illuminated component may be formed on or within an article of manufacture. The article of manufacture may form the substrate for the illuminated component.

The article of manufacture may be a base substrate that the light projects into and out of. The substrate may be a rigid structure that coatings adhere to, are disposed on, light sources are connected to, or a combination thereof. The substrate may be clear or substantially clear. The substrate may have receiving regions and emitting regions. The receiving regions and the emitting regions may be about 90 or more, about 115 degrees or more, or about 135 degrees or more apart. The receiving regions and the emitting regions may be about 180 degrees or less, about 160 degrees or less, or about 145 degrees or less apart. The receiving regions may receive light from the light sources. The emitting regions may emit the light from the substrate. The receiving regions and the emitting regions may be coplanar, perpendicular, parallel, at an angle relative to one another, or a combination thereof. The emitting region may include textured portions, a texture, or both that permit or cause light to exit the substrate. The emitting portion may be located on a first side of the substrate (e.g., a lens) and the two or more coatings may be located on a second side of the substrate. The substrate may be a lens or light directing device. The emitting portion may be opposite the two or more coatings. The light emitting portions may include texture portions or may be free of texture portions. Light may reflect off of the light emitting portions if light contacts the light emitting portions at an angle different from a right angle. For example, light may only extend through the light emitting regions if the light contacts the light emitting regions at an angle substantially equal to a ninety degree angle (e.g., +The emitting portion may on or within an exterior of the substrate and the two or more coatings on or within an interior of the substrate (e.g., facing an internal of a vehicle).

The substrate may be made of or include a polycarbonate (PC), vinyl, acrylic, polymethyl methacrylate (PMMA), polyethylene terephthalate (PET), amorphous copolyester (PETG), polyvinyl chloride (PVC), polyethylene (PE), ionomer resin, polypropylene (PP), fluorinated ethylene propylene (FEP), Styrene Methyl Methacrylate (SMMA), styrene acrylonitrile resin (SAN), polystyrene, Methyl methacrylate acrylonitrile butadiene styrene (MABS), or a combination thereof. The substrate may have some flexibility (e.g., may elastically deform 1-5 degrees) when contacted without breaking or plastically deforming. The substrate may be colored. The substrate may have a first color and the coatings may provide additional coloring. The coloring of the substrate may not change the color of light provided when light extends through the substrate. The coloring of the substrate may change the coloring of the coating. For example, if the substrate is yellow and the coating provides a blue hue the corresponding light may be green. The substrate may form any shape discussed herein or may be connected to another device. The substrate may form the article of manufacture such that no other components are needed. The substrate may direct light outward at predetermined locations. The predetermined locations may be a textured portion, a non-opaque portion, a transparent portion, or a combination thereof.

The texture portions function to prevent hot spots, provide a homogenous light pattern, a homogenous amount of light, spread the light, prevent overlaps of light from light sources, direct light out of the substrate, or a combination thereof. The textured pattern may provide a homogenous lighting appearance when the light is viewed from an external location of a vehicle, an internal location of a vehicle, or both. The texture portion may be added to the substrate. For example, a texture may be sprayed on the substrate, etched into the substrate, mechanically added, mechanically formed, added during molding, or a combination thereof. The textured portions may be on an external surface, an internal surface, a location between the internal surface and the external surface, or a combination thereof. The texture portions may guide light out of the substrate as the light travels through the substrate. The textured portions may change a direction of the light. The textured portions may permit light to exit a surface of the substrate. The texture portions may be formed while the substrates are being formed. Some substrates may include a texture portion on or in an external surface and an internal surface. The textured portions (e.g., micro-optics) may create an area where light exits the substrate. The textured portions may permit light to extend out of the substrate, change directions within the substrate, or both. The texture portion may have a shape that is a pyramid, half circle, square, rectangle, zig zag patterns, lines, cylindrical, tetrahedron, cube, hexagonal, icosahedron, a prism, a pentagonal pyramid, a cone, cuboid, a symmetrical shape, an asymmetrical shape, a geometric shape, a non-geometric shape, or a combination thereof. The textured portions and the coating may overlap, be coplanar, be located in a same area or region, or a combination thereof. The textured portion may extend substantially a same length, a same width, or both as the substrate. The textured portion may terminate at a texture shutoff such that the textured portion does not extend beyond the textured shutoff. The textured shutoff may be a region where the texture portion ends and the light does not extend out of the substrate. The texture portions may be covered by one or more coatings. The texture portions may be located opposite the coatings.

The substrate may directly hold and/or contact the coatings placed thereon. The coatings function to change a color of light when the light contacts the coatings. The coatings may change a color of light when the light contacts the coatings and are reflected by the coatings. The coatings may change a wavelength of the light. Each coating may provide a different color. Thus, if two coatings are present the illuminated component may provide two different colored lights, three different colored lights, or even four different colored lights. For example, the substrate may have a colored portion and a clear portion that provide two colors and the coatings may each provide one color for a total of four different color lights. The coatings may be the only part of the illuminated component that provide light and/or coloring. The coatings may reflect light. The coatings may reflect light out of the substrate. The coatings may be disposed in a predetermined pattern. The coatings may be applied one over the other. A mask may be applied and then a first coating applied. A first coating may be applied and then a portion of the coating may be removed. The coating may be removed by any technique that removes the coating without damaging the substrate. The coating may be removed by ablation, laser remove, scrapping, sanding, wet sanding, or a combination thereof. Only the first coating may be removed.

The second coating may be applied to the regions of substrate with no first coating. The second coating may be applied over the first substrate and fill regions or areas that are absent the first coating or other coatings. The second coating may be applied in patterns or shapes discussed herein. The first coating and second coating (and any other subsequent coating) may be free of any overlap. The first coating and second coating (and any subsequent coating) may include some overlap. The coatings may include two or more coatings, three of more coatings, or even four or more coatings. The coatings may include ten or less coatings, eight or less coatings, or six or less coatings.

The coatings may generate a color when light contacts or extends into the coating. The coatings may change a color of light when light is reflected by the coatings. The coatings may be made of or include phosphorous, a photochromatic component, silicone phosphor, a chemiluminescence coating, zinc phosphate, chromium, zinc, vanadate, zirconium, manganese, iron, or a combination thereof. The coating may include phosphor, a host material, and an activator. The coating may include copper zinc sulfide, silver zinc sulfides, oxides, nitrides, oxynitrides, sulfides, selenides, halides, silicates of zinc, cadmium, manganese, aluminum, silicon, a rear earth metal, nickel, or a combination thereof. The coatings may be fluid or solid before being applied. The coatings may be a sheet or a film that may be adhered to a substrate. The coatings may be a liquid that may be deposited on a substrate. The coating may be deposited by spraying, painting, rolling, atomizing, airless spraying, electrostatic application, dipping, brushing, or a combination thereof. The coatings may be applied on one or more sides of a substrate. The coatings may be applied to a single side of a substrate. The coatings may be dried after being applied. Heat may be applied to the coatings to dry the coatings. The coatings may be dried by ambient conditions. The coatings may be applied to a substrate that is free of a light source.

The light sources function to produce light, direct light into a substrate, or both. The light source may be a device or a plurality of devices that create light and the light extends outward from the light source. The light source may produce a high beam, a low beam, a blending beam, a running light, a day time light, a turn signal, a brake light, a warning light, a communication, ornamentation, a signal, decoration, or a combination thereof. The light sources may have different functions. For example, one light source may provide a running light, another light source may be a turn signal, and another light source may provide a signal, communication, decoration, or ornamentation. The light source may comprise a plurality of lights or may be a single light source within a set of light sources. The plurality of lights may be in one set or group of light sources. The light source may be a single light that projects light. In another example, a light source may direct light in a first direction. The light sources may direct light in a first direction. The substrate may direct light from the light sources in a second direction.

The light sources may be any type of lighting device that produces light such as an incandescent bulb, fluorescent light, compact fluorescent lamp, halogen lamp, light emitting diode (LED), high intensity discharge lamps (HID); halogen lights, xenon lights, a laser diode, phosphorous bulb, or a combination thereof. The light source may be a single lamp or bulb. Preferably, the light source is part of a set of light sources that includes a plurality of lamps, bulbs, diodes, or a combination thereof. The light source may be part of a set of light sources that includes 2 or more, 3 or more, 4 or more, 5 more, 7 or more, 9 or more, or 11 or more lights that produce light and combine together to form the light extending from the light system. The sets of light sources may include 20 or less, 18 or less, 16 or less, or 14 or less lights that produce light (e.g., each set may include 8 light sources or alternatively all of the sets when combined together may include 8 light sources or 2 light sources). For example, the set of light sources may be the contents of a single printed circuit board that perform a same lighting function and the set of light sources may be 8 lights. The number of light sources in a part of the light may dependent upon a size of the region or a size illuminated. Thus, the light source may be one or more lights, two or more lights, or three or more lights. The light source may be static. The light sources may be free of movement. The light source may be fixed. The light sources may be static and may be manually or physically adjusted so that the light sources are directed to a desired location. The light sources may be fixed and the light from the light source may be moved, bent, directed, or a combination thereof by optical elements, textured portions, micro-optics, or reflectors (e.g., a substrate or a portion of a substrate). Each device (e.g., light or LED) of the light source may be turned on and off. The light sources may be illuminated in a sequence. The light source may be located within a light system at a location relative to a substrate, an edge of a substrate, a side of a substrate, or a combination thereof. The light sources may work together as a set of light sources to create light. All of the light sources may be a same color or provide a same color light. For example, all of the lights may be white or non-colored light. All of the light sources may be a single color light source.

The set of light sources function to fill a light bar, a lens, an outer housing, an outer lens, light blade, a substrate, an edge of a substrate, a side of a substrate, or a combination thereof so that light projected outward to perform some function. The set of light sources may be a single function (e.g., a high beam, a low beam, a blending beam, a running light, a daytime light, a turn signal, a brake light, ornamentation, a display, signaling, or a combination thereof). Each set of light sources may perform a single function. The light sources may extend in a row, in a column, a straight line, or a combination of both. All of the lights within a set of light sources may provide the same light (e.g., color, color temperature, or wavelength). One set of light sources may include lights that may be yellow, orange, red, or white (e.g., OEM white, off white, pure white, or crystal white (e.g., having a color temperature between 4300K and 6000K)). The color, intensity, temperature, or a combination thereof within one light source may all be identical. The light from the light system may be directed to a predetermined location depending on a function of the light from that set of light sources. The light from the light sources may be directed outward from a vehicle so that the light is visible external of the vehicle. The light sources may be controlled my one or more controllers.

The controllers function to control the light sources or the lights within a light source individually. The controller may be part of the vehicle, part of the light system, or both. A single controller may control all of the lights. The controller may illuminate (e.g., fire) the lights in a sequence, individually, in a pattern, a predetermined manner, a predetermined sequence, randomly, or a combination thereof. The controller may be programmable, include pre-set programs, or both. The controller may be accessed inside of the vehicle so that the user can change the illumination settings of the light system. The controller may communicate with light sources through one or more printed circuit boards.

The light sources (and lights) may be located on or connected to one or more printed circuit boards. The printed circuit boards (PCB) may provide power, signals, support, or a combination thereof to one or more light sources. The PCB may be fixed within a light system. Each PCB may be connected to a plurality of light sources. The PCB may be electrically connected, mechanically connected, or both to one or more light sources discussed herein. The PCBs may aim the light from the light sources. The PCBs may align a light source with a light guide.

The teachings herein create an illuminated component that may be made by one of more steps taught herein. The process may begin by forming or obtaining an article of manufacture. The article of manufacture may be a base article or device that forms a substrate. The substrate may be clear, transparent, translucent, partially opaque, or a combination thereof. The substrate may have a first coating applied. A mask may be applied to the substrate. The mask may be removed. The first coating may be applied without a mask being present. The first coating may be applied then a portion of the first coating may be removed. The first coating may be removed to generate a pattern, a shape, a word, an image, any other shape herein, or a combination thereof. The first coating may be free of removal, masking, or both. The first coating may be a complete layer. The first coating may be a partial layer. The first coating may be dried. A second coating may be applied over all or a portion of the first coating. The second coating may be applied over a mask so that when the mask is removed all or a portion of the second coating is removed. The second coating may be applied and then a portion of the second coating removed. The coatings may be removed by the techniques discussed herein. The coatings may be removed by ablation. The second coating may be a complete coating and may be free of removal. The second coating may be applied in a pattern without masking or removal. The second coating may partially overlap or completely overlap the first coating. The second coating may be free of any overlap with the first coating. A third coating may be applied. The third coating may be masked and then the masking removed. The third coating may be applied over a mask. The third coating may be applied and then a portion of the third coating may be removed. Once all of the coatings are applied the substrate will be an illuminated component. The coatings may be dried.

The illuminated component may be aligned relative to one or more light sources. The light sources may be directed through an edge, a side, or both of the illuminated component. The illuminated component may provide light with a single color. The light may extend into the illuminated component a first color and then exit the illuminated component as two or more different colors. The color of the lights may be a primary light color. The primary light color may be changed by a first coating into a first secondary light color. The primary light color may be changed into a second secondary light color. If more then 2 coatings are applied then there may be a third secondary light color, a fourth secondary light color, or both.

FIG. 1A illustrates a side view of a vehicle 2 including light systems 10. The light systems 10 provide light around the vehicle 2. The light systems 10 are located at a fore 4 end of the vehicle 2 but could be located at an aft 6 of the vehicle 2. The light systems 10 include an illuminated component 12. The light systems 10 may be controlled by one or more controllers 8 jointly or individually. The illuminated component 12 is a bumper 92 and a door handle 94.

Figure 1B:
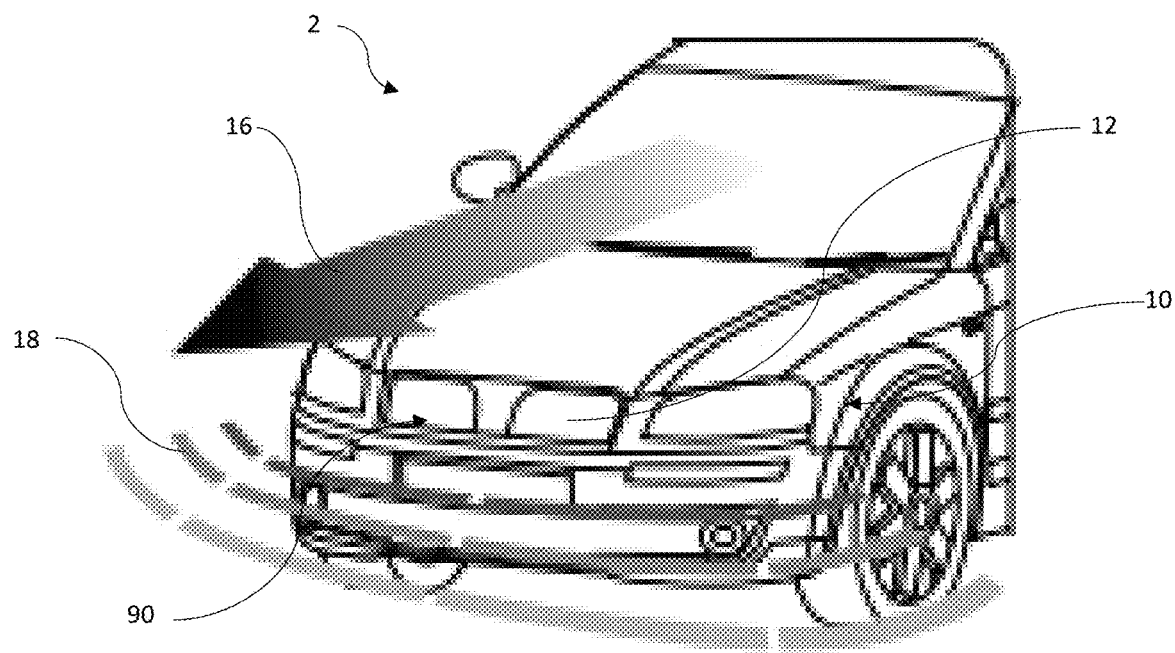
FIG. 1B is a front view of a light system including an illuminated component.

FIG. 1B is a forward end of the vehicle 2. The forward end includes light systems 10 including an illuminated component 12. The illuminated component 12 is shown as a grille 90 of the vehicle 2. The illuminated component 12, as shown, faces in a direction of motion 16 and directs light in the direction 18 or is visible when facing a forward end of the vehicle 2 (or any other side/end of the vehicle 2 including an illuminated component).

Figure 2:
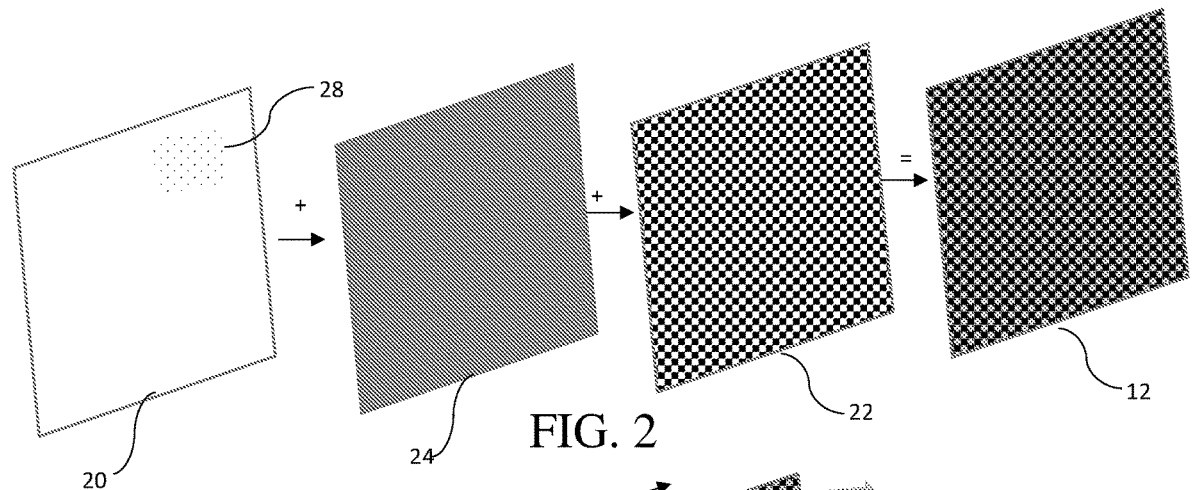
FIG. 2 illustrates a partial exploded view of an illuminated component.

FIG. 2 is an exploded view of components of the illuminated component 12. The illuminated component 12 includes an article of manufacture 20 (e.g., a substrate). A first coating 22 and a second coating 24 are located on the article of manufacture 20. When the first coating 22 and the second coating 24 are located on the article of manufacture 20 the illuminated component 12 is formed. A texture pattern 28 may be created on or within all or a portion of the substrate 20. As shown, the texture pattern 28 is located only in or on a portion of the substrate 20.

Figure 3:
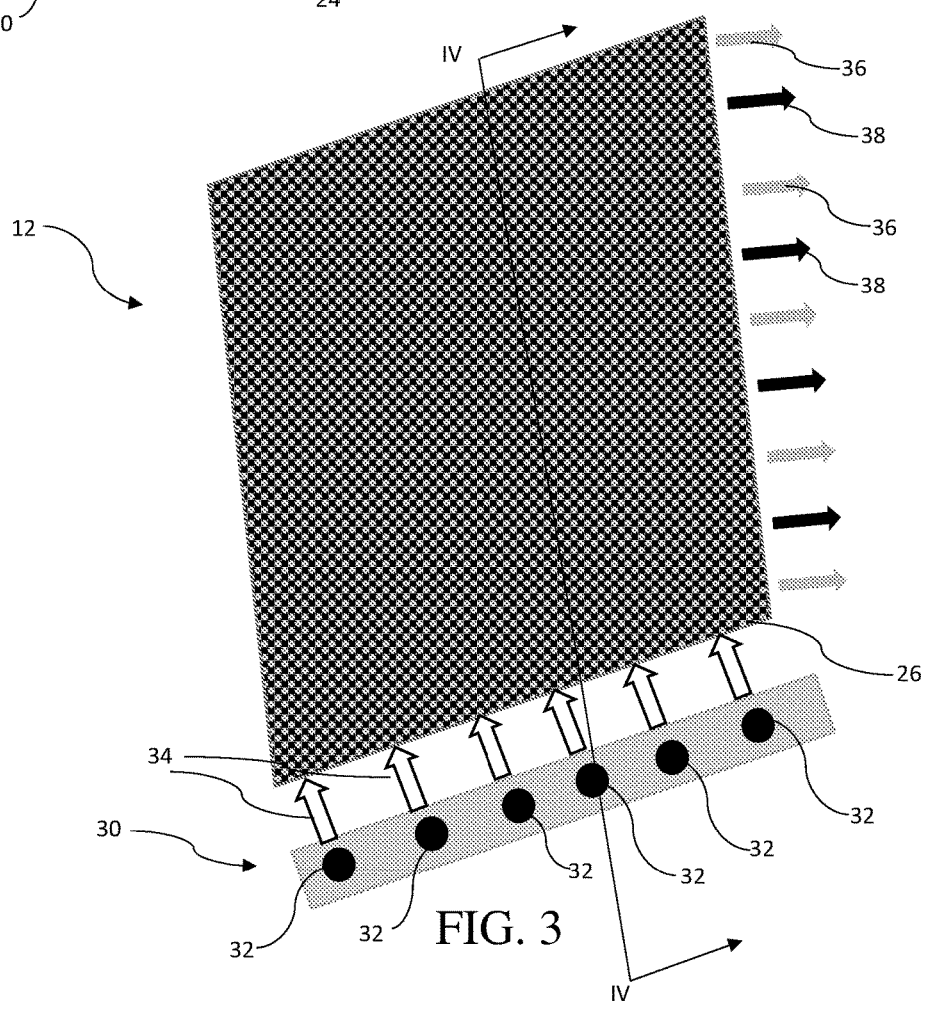
FIG. 3 illustrates an illuminated component providing lights.

FIG. 3 is and isometric view of an illuminated component 12 being illuminated by a light source 30. The light source 30 includes a plurality of lights 32 that direct light with a primary light color 34 into the illuminated component 12. As show the primary light color 34 extends into an edge 26 of the illuminated component. The light with the primary light color 34 then exits the illuminated component 12 as a first secondary light color 36 and as a second secondary light color 38 to provide an image, shape, message, some other form of communication, or a visual enhancement.

Figure 4A:
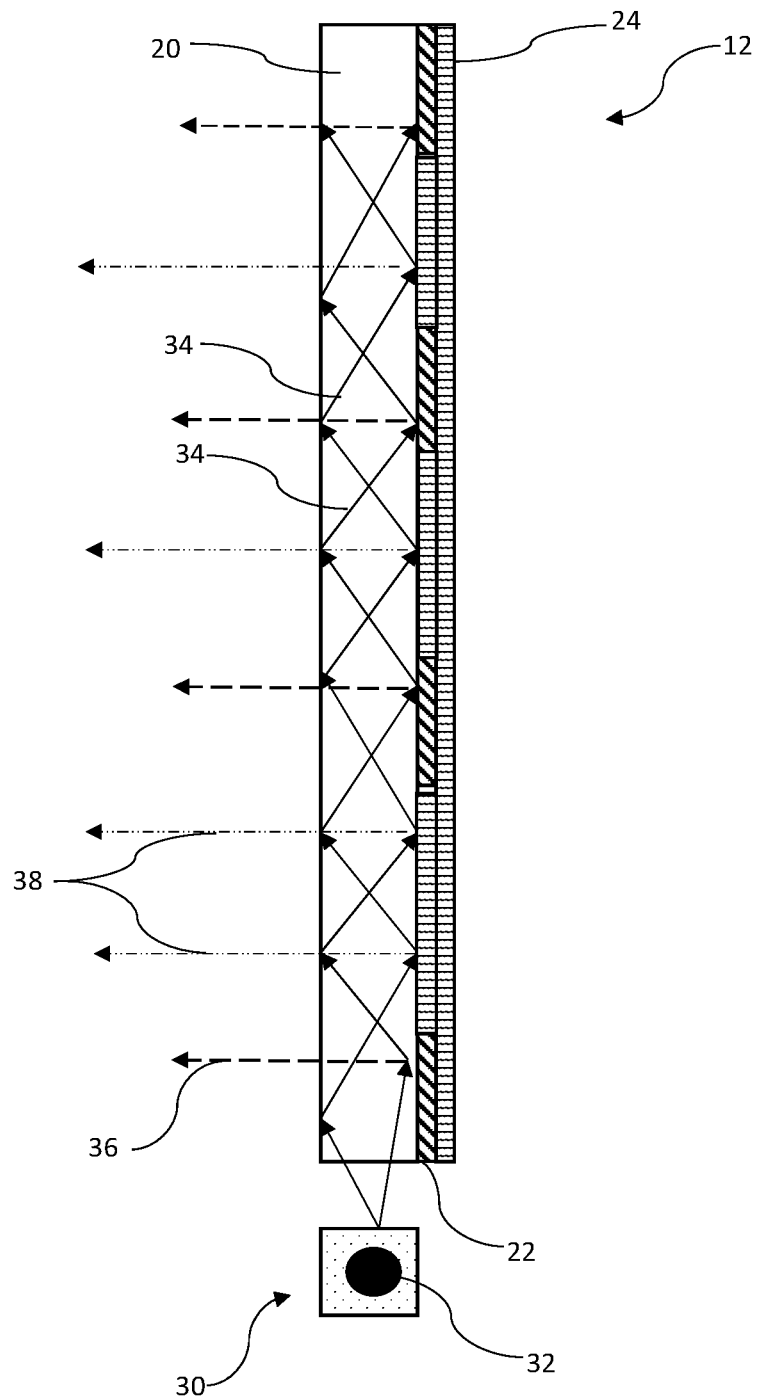
FIG. 4A illustrates a cross-sectional view of the illuminated component of FIG. 3 along lines IV-IV.

FIG. 4A is a cross-sectional view of the illuminated component 12 of FIG. 3 along lines IV-IV. The illuminated component 12 includes a substrate 20 with a first coating 22 over a portion of the substrate 20 and a second coating 24 that extends over both the substrate 20 and all or a portion of the first coating 22. The second coating 24 has a portion that is coplanar with the first coating 22. The first coating 22 and the second coating 24 reflect light from a rear side of the substrate 20 and out the front side of the substrate 20. A light source 30 including lights 32 is located adjacent to an edge 40 of the substrate 20. Light is directed from the lights 32 into the substrate 20. The light from the lights 32 has a primary light color 34 and is redirected within the substrate 20. Some of the light with the primary light color 34 extends out of the substrate 20 after contacting the first coating 22 and has a first secondary light color 36. Some of the light extends out of the substrate 20 after contacting the second coating 24 and has a second secondary light color 38. The first secondary light colors 36 and the second secondary light colors 38 provide an image and are separately visible.

Figure 4B:
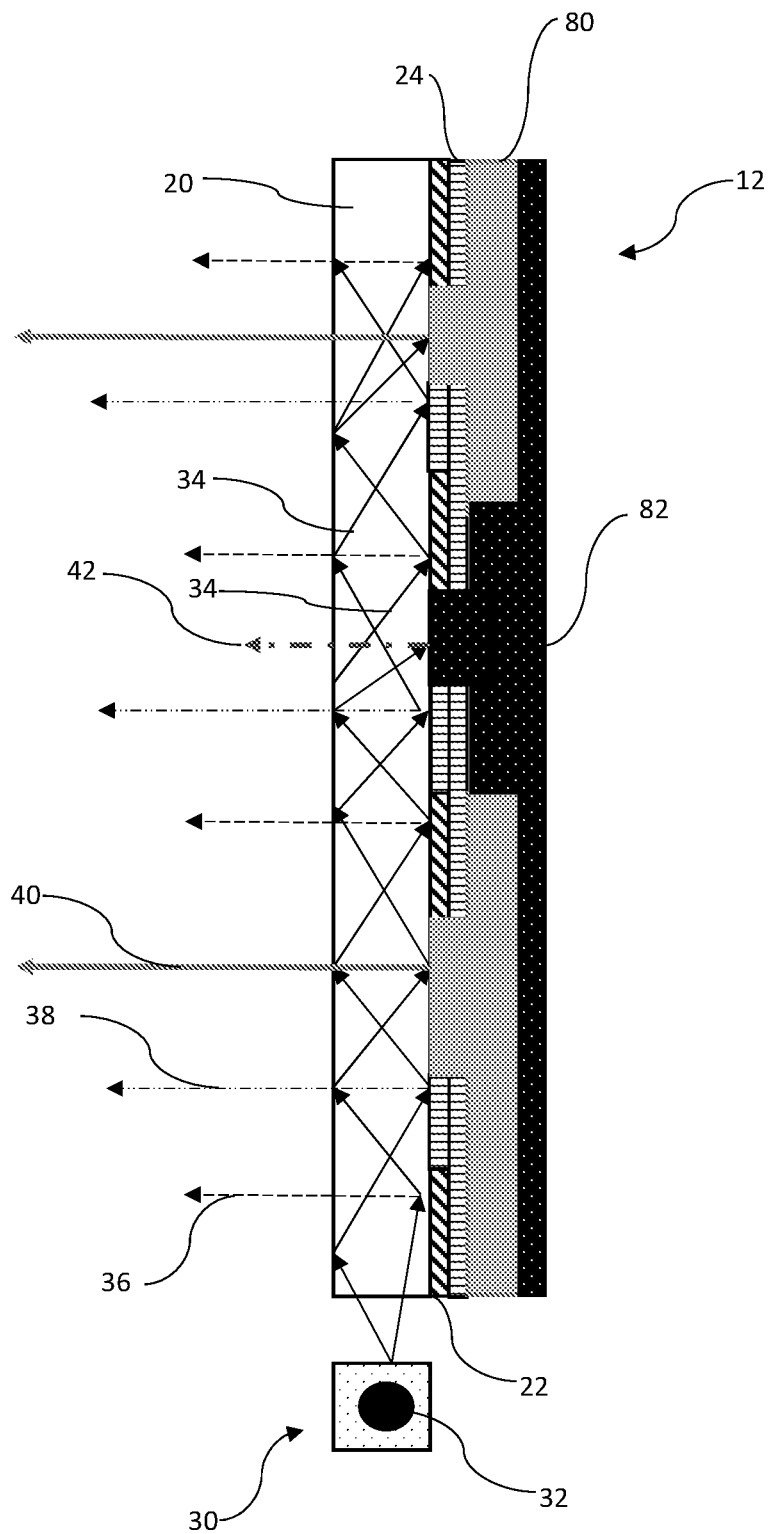
FIG. 4B illustrates a cross-sectional view of an illuminated component that produces four light colors.

FIG. 4B illustrates a cross-sectional view of an example of an illuminated component 12. The illuminated component 12 includes a substrate 20 with a first coating 22, a second coating 24, a third coating 80, and a fourth coating 82. The first coating 22 directly extends over a portion of the substrate 20. The second coating 24 extends over both the substrate 20 and all or a portion of the first coating 22. The second coating 24 has a portion that is coplanar with the first coating 22. The third coating 80 has a portion that directly contacts the substrate 20, and a portion that extends over all or a portion of the first coating 22, the second coating 24, or both. The fourth coating 82 has a portion that directly contacts the substrate 20, and a portion that extends over all or a portion of the first coating 22, the second coating 24, the third coating 80, or a combination thereof.

The first coating 22, the second coating 24, the third coating 80, and the fourth coating 82 reflect light from a rear side of the substrate 20 and out the front side of the substrate 20. A light source 30 including lights 32 is located adjacent to an edge of the substrate 20. Light is directed from the lights 32 into the substrate 20. The light from the lights 32 has a primary light color 34 and is redirected within the substrate 20. Some of the light with the primary light color 34 is reflected out of the substrate 20 by reflection or redirection by the first coating 22. The first coating 22 changes the primary light color 34 into a first secondary light color 36. Some of the light extends out of the substrate 20 by being reflected from the second coating 24. The light from the second coating 26 has a second secondary light color 38. Some of the light extends out of the substrate 20 by being reflected from the third coating 80. The light from the third coating 80 has a third secondary light color 40. Some of the light extends out of the substrate 20 by being reflected from the fourth coating 82. The light from the fourth coating 82 has a fourth secondary light color 42. The first secondary light colors 36, the second secondary light colors 38, the third secondary light colors 40, and the fourth secondary light colors 42 provide an image and are separately visible.

Figure 5:
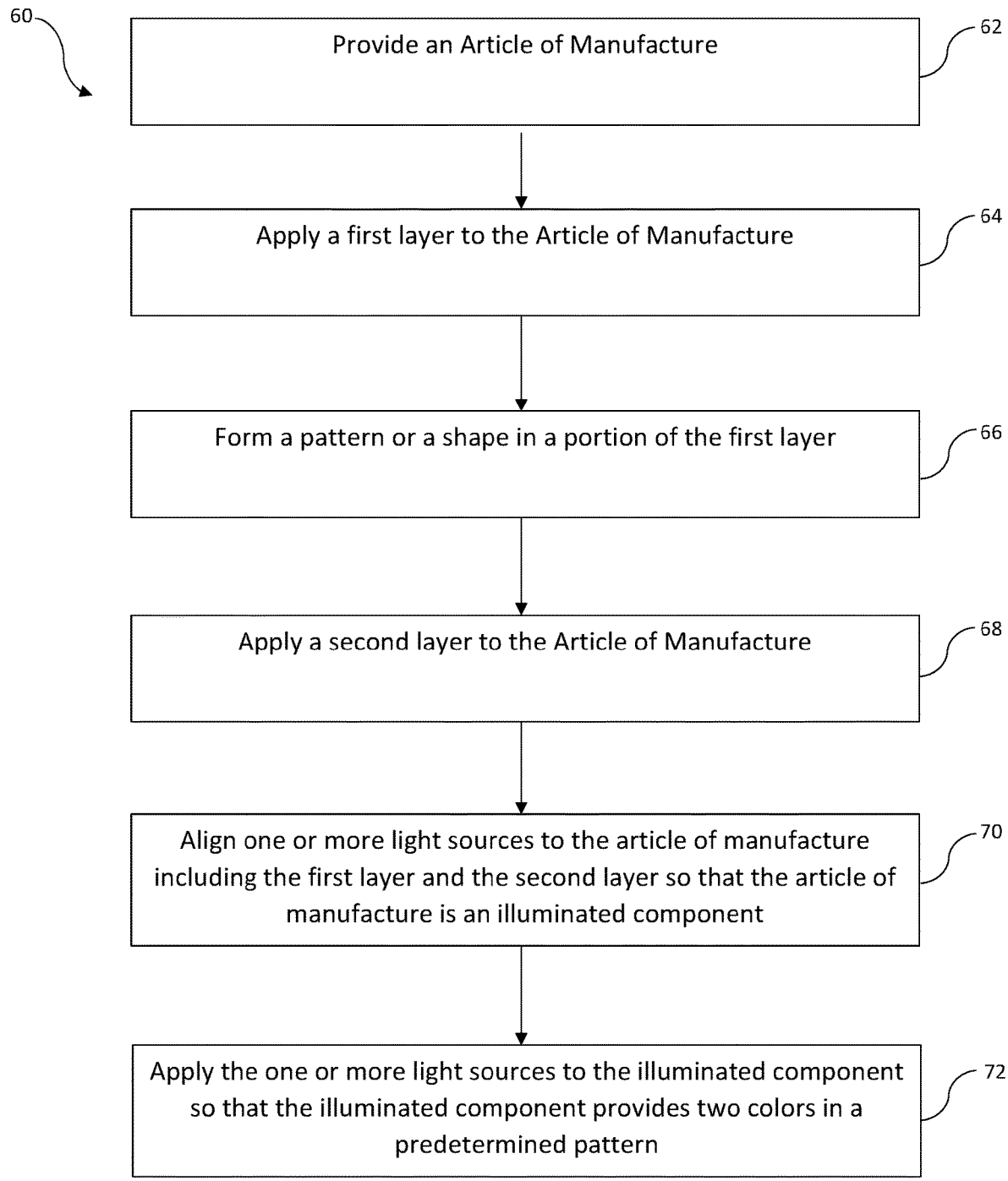
FIG. 5 illustrates a process of forming an illuminated component.

FIG. 5 is an example of a process 60 of manufacturing the illuminated component 12 taught herein. The process 60 begins with an article of manufacture 62. The article of manufacture 62 is a substrate when a first layer is applied to the article of manufacture 62. A pattern is formed in the first layer before or after the first layer is applied to the article of manufacture 64. For example, a mask may be applied to the article of manufacture. Ablation may be used to remove the first layer form the article of manufacture. Once the first layer is shaped or made into a pattern a second layer is applied to the article of manufacture 68. After the second layer is applied one of more light sources are located adjacent to the illuminated component 70. Illuminating the illuminated component so that two colors are visible in the predetermined pattern 72.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including"

to describe combinations of elements, ingredients, components or steps herein also contemplates embodiments that consist essentially of or even consists of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

ELEMENT LIST

2 Vehicle
4 Fore
6 Aft
8 Controller
10 Light System
12 Illuminated component
14 Outer lens
16 Direction of motion
18 Light direction
20 Substrate (Article of Manufacture)
22 First Coating
24 Second Coating
26 Edge of illuminated component
28 Texture Pattern
30 Light Source
32 Lights
34 Primary Light Color
36 First Secondary Light Color
38 Second Secondary Light Color
40 Third secondary light color
42 Fourth secondary light color
60 Process of Manufacture
62 Provide an Article of Manufacture (Substrate)
64 Apply a first layer
66 Form a Pattern or Shape
68 Apply a Second Layer
80 Third coating
82 Fourth coating
90 Grille
92 Bumper
94 Door Handle

We claim:
1. An illuminated component comprising:
a substrate;
a first coating covering at least a portion of the substrate;
an absence of the first coating on the substrate, wherein the absence is an area where the first coating is removed from the substrate to form the first coating into a first pattern;
a second coating covering at least a portion of the substrate, the first coating, or both so that the second coating forms a second pattern on the substrate, and the second coating covers the portion of the substrate where the first coating is absent to fill some or all of the first pattern so that the first coating and the second coating, within the portion of the substrate where the first coating is absent, are coplanar, and the second coating is enclosed within at least a portion of the first coating; and
one or more light sources aligned with the substrate and project light of a first color;
wherein:
the light of the first color is received by the first coating to provide light of a second color that is different from the first color,
the light of the first color is received by the second coating to provide light of a third color that is different from the first color and the second color, and
the pattern is visible in second color and the third color when the one or more light sources are illuminated,
wherein the illuminated component is configured to be connected to a vehicle.

2. A grille of the vehicle comprising the illuminated component of claim 1.

3. The illuminated component of claim 1, wherein the one or more light sources are aligned with an edge of the substrate so that the light extends into the substrate in a first direction and out of the substrate in a second direction that is different from the first direction.

4. The illuminated component of claim 1, further comprising:
a third coating disposed over the substrate, the first coating, the second coating, or a combination thereof.

5. The illuminated component of claim 1, wherein the substrate is transparent.

6. The illuminated component of claim 2, wherein the substrate is made of polycarbonate.

7. The illuminated component of claim 1, further comprising phosphor in at least one of the first coating or the second coating.

8. The illuminated component of claim 7, wherein the first coating comprises phosphor and a metal selected from copper, zinc, chromium, zinc, vanadate, zirconium, manganese, iron, or a combination thereof.

9. The illuminated component of claim 1, further comprising:
a mask that covers at least a portion of the substrate and upon removal forms the absence of the first coating on the substrate.

10. The illuminated component of claim 9, wherein the first coating and the second coating cover an entirety of the substrate.

11. An illuminated component comprising:
a substrate comprising:
a first surface,
a second surface,
two or more coatings disposed on the first surface of the substrate, wherein the two or more coatings comprise:
a first coating covering at least a portion of the first surface of the substrate;

a second coating covering at least a portion of the first surface of the substrate, the first coating, or both so that the first coating and the second coating form a pattern, shape, image, decoration, or a combination thereof therebetween; and one or more light sources aligned with the substrate to project light with a single color into the substrate;

wherein the light with the single color contacts the first coating and is changed into a second color, and the light with the single color contacts the second coating and is changed into a third color so that the pattern, the shape, the image, the decoration, or a combination thereof is visible in two colors from an exterior of a vehicle comprising the illuminated component.

12. The illuminated component of claim 11, wherein the first coating completely covers the first surface of the substrate and the second coating is absent over portions of the substrate.

13. The illuminated component of claim 11, wherein the substrate is a bumper, a door handle, a grille, or a combination thereof.

14. The illuminated component of claim 11, wherein the substrate changes a direction of the light with the single color about 90 degrees or more.

15. The illuminated component of claim 11, wherein the first coating is absent over a portion of the first surface of the substrate or the first coating and the second coating are in direct contact with the substrate.

16. The illuminated component of claim 15, wherein the second coating extends over the portion of the first surface of the substrate where the first coating is absent so that the first coating is free of any overlap with the second coating.

17. The illuminated component of claim 11, wherein at least a portion of the first coating and the second coating are coplanar.

18. The illuminated component of claim 17, wherein the first coating and the second coating each include phosphor.

19. The illuminated component of claim 17, wherein at least a portion of the second coating overlaps the first coating.

20. The illuminated component of claim 19, wherein the light with the single color extend through second coating, the first coating, and the second coating at the overlap of the first coating.

* * * * *